B. F. COBB.

Riveting-Tools.

No. 5,297.

Reissued Feb. 25, 1873.

Witnesses:

Chas. Nida

Wm. H. C. Smith.

Inventor:

B. F. Cobb.

PER Munn & Co

Attorneys.

AM. PHOTO-LITHOGRAPHIC CO. N.Y. (OSBORNE'S PROCESS.)

UNITED STATES PATENT OFFICE.

BENJAMIN F. COBB, OF WEST TROY, NEW YORK, ASSIGNOR TO EBENEZER PRESCOTT.

IMPROVEMENT IN RIVETING-TOOLS.

Specification forming part of Letters Patent No. 115,821, dated June 13, 1871; reissue No. 5,297, dated February 25, 1873.

*To all whom it may concern:*

Be it known that I, BENJAMIN F. COBB, of West Troy, in the county of Albany and State of New York, have invented a new and Improved Riveting-Tool; and I do hereby declare that the following is a full, clear, and exact description thereof, which will enable others skilled in the art to make and use the same, reference being had to the accompanying drawing forming part of this specification, in which—

Figure 1:
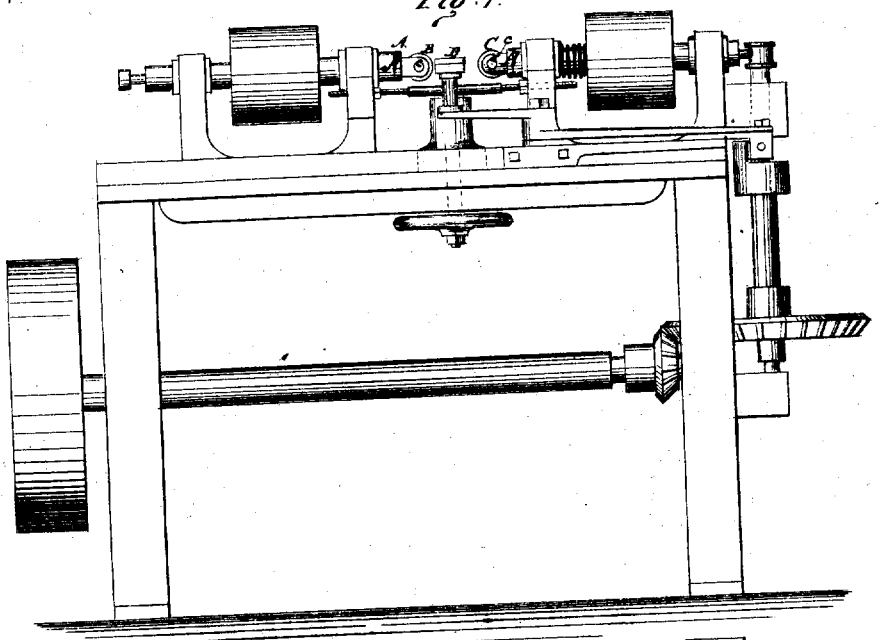
Figure 2:
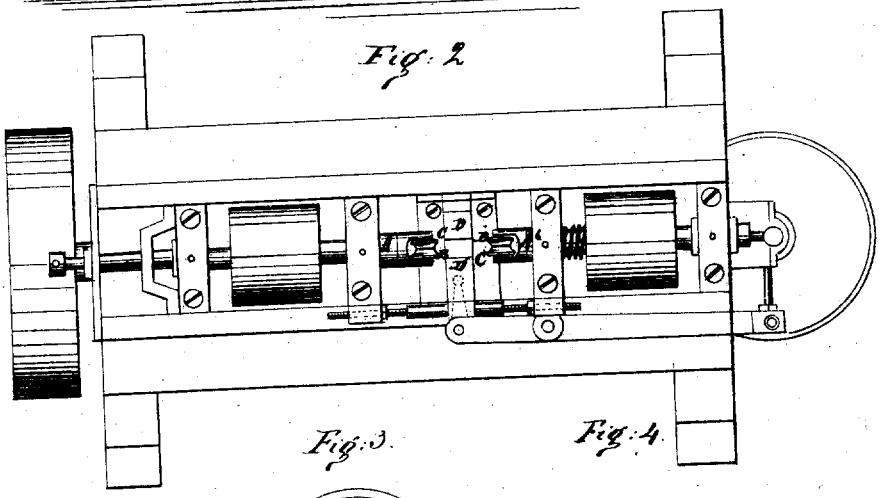
Figure 3:
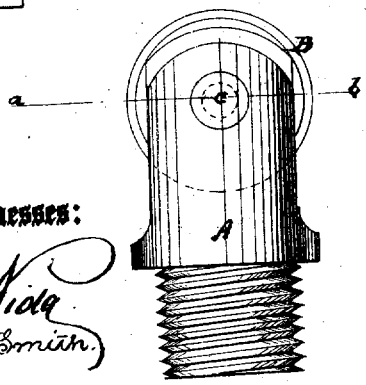
Figure 4:
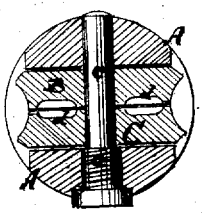

Figure 1 represents a side elevation of a machine provided with my improved riveting-tool. Fig. 2 is a plan or top view of the same. Fig. 3 is a detail side view of the riveting-tool. Fig. 4 is a detail transverse section of the same on the line *a b*, Fig. 3.

Similar letters of reference indicate corresponding parts.

This invention relates to a new tool for riveting the pivots of hinges and upsetting the ends of all kinds of bolts or pins. The invention consists in the use of two equal-sized contiguous rollers hung upon the same pin, and applied against the ends of the pins or bolts under a twofold rotation, so as thereby to head the pins or bolts in the desired manner. The invention consists, also, in notching the contiguous faces of the rollers to give room for the escape of particles that may be rubbed off the pins or bolts.

This invention introduces an entirely new system of riveting by friction transversely under longitudinal pressure, instead of the ordinary hammering process, which uses force only longitudinally, and racks machinery and buildings without being continuous in operation.

By rotating the tool under lengthwise pressure the action is continuous, and therefore actually quicker than the hammering, besides being more gentle and less injurious to the machinery.

The fibers of the pin or bolt to be headed will be gradually bent over, and cannot be fractured, as is frequently done by hammering. The rivet produced will consequently be of superior quality to those heretofore made.

A in the drawing represents the shank of my improved riveting-tool. It is of cylindrical or other form, and serves to hold a transverse pin, *c*, on which two rollers, B and C, are hung. These rollers are of equal diameters, and close together, and hang both loose on the pin *c;* or one is loose and the other fast thereon, if desired. The edges of the rollers are made concave, as shown, for making convex rivet-heads, or of other suitable shape, according to the form of head to be made.

The tool is used by holding the joined edges of the rollers with sufficient pressure against the end of the pin to be upset, and then revolving the shank A on its axis. This will cause the rollers B C to rotate on the end of the pin, but in opposite directions.

The power of the rollers, as exerted against the pin, will increase toward the circumference of the same with the increase of motion away from the axis of the pin. The fiber of the pin will thus be gradually laid or folded over to form the head.

In order to prevent chips or small pieces that might be worked off the pin from entering between the rollers and binding the same I have provided a small number of notches, *d d*, in the contiguous faces of the rollers, into which such pieces can enter, and whence they can drop out during the rotation of the rollers.

In Figs. 1 and 2 is represented a machine for riveting the pivots of hinges. It shows two of my tools above described held in line, and a pair of jaws, D D, between them for holding the hinge. The latter is dropped between the jaws and secured thereby, and then the tools are at once applied to both ends of the pivot, rotated till the head is completed, and finally withdrawn. The riveting process can thus be carried on with great rapidity, exactness, and neatness.

Having thus described my invention, I claim as new and desire to secure by Letters Patent—

1. Two equal-sized contiguous rollers, B C, hung upon the same pin, and arranged to be applied against the ends of the pins or bolts under a twofold rotation, for the purpose and in the manner specified.

2. The two rollers B C, having their contiguous faces notched to give room for the escape of particles that may be rubbed off the pins or bolts.

BENJ. F. COBB.

Witnesses:
W. D. PRESCOTT,
G. R. D. PRESCOTT.